July 18, 1944.  V. J. SKOGLUND  2,354,151

FLUID NOZZLE

Filed April 16, 1942

INVENTOR
Victor J. Skoglund
BY
Harris G. Luther
ATTORNEY

Patented July 18, 1944

2,354,151

UNITED STATES PATENT OFFICE 2,354,151

FLUID NOZZLE

Victor J. Skoglund, San Diego, Calif., assignor to United Aircraft Corporation, East Hartford, Conn., a corporation of Delaware Application April 16, 1942, Serial No. 439,167

2 Claims. (Cl. 60—35.6)

This invention relates to improvements in fluid nozzles and has particular reference to an improved expansion type nozzle for directing a jet of hot gaseous fluid.

An object of the invention resides in the provision of an improved nozzle of the character indicated which can handle high temperature fluid, such as exhaust gas, without itself becoming overheated.

A further object resides in the provision of an improved fluid nozzle of the character indicated which is continuously cooled by a flow of cooling fluid therethrough and in which the nozzle walls are protected by a layer of cooling fluid interposed between the walls and the hot fluid passing through the nozzle.

Other objects and advantages will be more particularly pointed out hereinafter or will become apparent as the description proceeds.

In the accompanying drawing, in which like reference numerals are used to designate similar parts throughout, there is illustrated, in two somewhat different forms, a suitable mechanical embodiment for the purpose of disclosing the invention. The drawing, however, is for the purpose of illustration only and is not to be taken as limiting or restricting the invention since it will be apparent to those skilled in the art that various changes in the illustrated embodiment may be restorted to without in any way exceeding the scope of the invention.

High speed jets of extremely high temperature gases have been found to be useful in many applications for developing power either as the total result of the combustion of fuel or in addition to power developed by a fuel consuming engine. A typical example of such an application is in the use of the exhaust gases of an internal-combustion aircraft engine to drive a turbine which may be used to operate an engine supercharger or to provide rearwardly directed jets which add their reactive force to the propulsive forces exerted on the airplane by the engine. Various other applications of such high speed, high temperature jets will readily occur to those skilled in the art.

In producing the necessary equipment for providing such high speed jets of high temperature gas, such as engine exhaust gas, it has been found that the jet producing nozzles are subject to rapid deterioration because of the high temperature of the gases passing therethrough, the errosive effects of the high speed gas jets, and other causes. It is among the objects of this invention to provide an improved nozzle which is not subject to such rapid deterioration.

Figure 1:
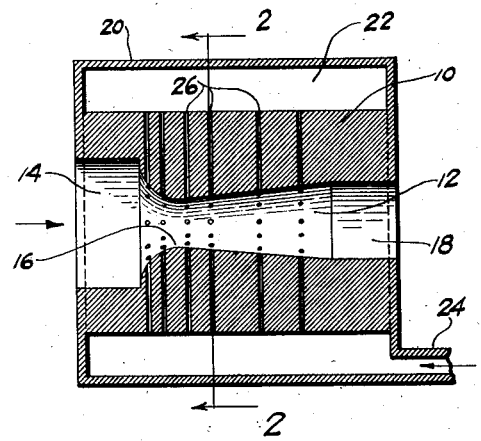
Fig. 1 is a longitudinal sectional view through one form of fluid jet directing nozzle constructed according to the invention.
Figure 2:
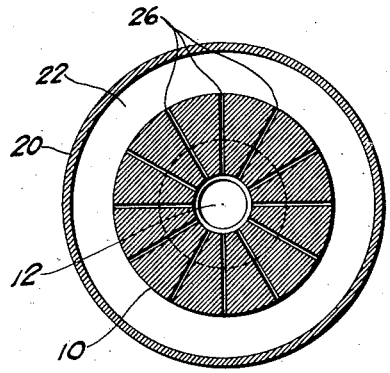
Fig. 2 is a transverse sectional view on the line 2—2 of Fig. 1.
Figure 3:
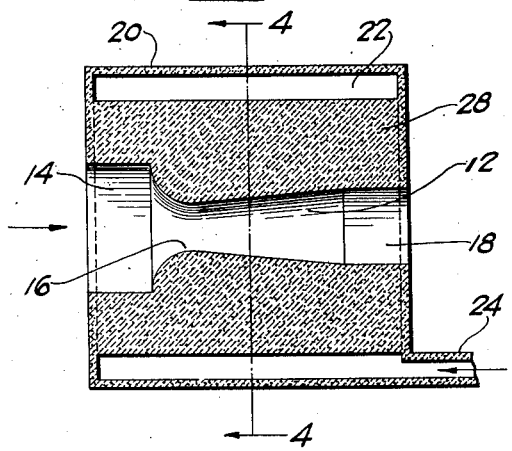
Fig. 3 is a longitudinal sectional view through a somewhat modified form of nozzle.
Figure 4:
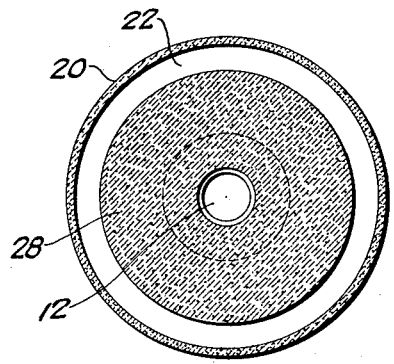
Fig. 4 is a transverse sectional view on the line 4—4 of Fig. 3.

Two slightly different forms of improved nozzles, constructed according to the invention, are shown in the accompanying drawing, one form being shown in Figs. 1 and 2 and a slightly different form in Figs. 3 and 4.

In the arrangement shown in Figs. 1 and 2 a nozzle block 10, which may be of generally cylindrical shape, is provided with a substantially axial bore 12 having a relatively large inlet portion 14, a restricted throat portion 16 from which the bore gradually flares to the exit opening 18. This block is preferably formed of some heat resistant material, such as a refractory ceramic, and may be enclosed in an annular casing 20 the ends of which are in contact with the ends of the nozzle but the sides of which are spaced from the block to provide a space 22 which preferably entirely surrounds the nozzle block 10. A cooling fluid conduit 24 leads into the space 22 and a large number of relatively small bores or apertures 26 lead from the space 22 through the wall thickness of the nozzle block to the bore 12. As is clearly apparent from Figs. 1 and 2, the bores 26 are distributed both axially and radially of the nozzle block between the entrance portion 14 and the exit portion 18 of the main bore 12 but are more widely spaced axially in the divergent portion of the main bore. The cooling fluid entering through the duct 24 may be under pressure sufficient to force the cooling fluid through the small bores 26 and into the main bore 12 although this pressure may be assisted to a considerable extent by the low pressure created near the throat portion of the nozzle by the flow of gases therethrough. Because the pressure of the cooling fluid will be substantially the same in various portions of chamber 22, the pressure drop between the throat 16 and chamber 22 will be greater than the pressure drop between chamber 22 and the converging inlet portion of the nozzle leading to the throat 16. However, the restricted cooling fluid passages (such as shown at 26 in Fig. 1) are longer at the throat portion and hence offer greater resistance to the flow of cooling fluid at this point, thus tending to insure an adequate flow of cooling fluid from chamber 22 to the converging inlet portion of the nozzle, or in other words, tending to equalize or regulate the flow of cooling fluid from the chamber to the throat as compared with the flow of cooling fluid from the chamber to the convergent inlet. Thus, the flow of cooling fluid under all laminar flow conditions to the convergent and throat portions of the nozzle is inherently approximately regulated by the nozzle structure of this invention. Under some laminar flow conditions, such as where a gas is expanded in a divergent nozzle portion to a back pressure which is less than the critical, the flow of cooling fluid may also be regulated by increasing the axial spacing of the restricted passages in the divergent portion, as illustrated in Fig. 1. As the cooling fluid which may be air enters the bore 12 at right angles to the flow of the hot gases therethrough it will be led along the wall of the bore 12 to cool the wall and also provide a heat insulating layer of cooling fluid between the nozzle wall and the hot gas passing through the nozzle. As the cooling fluid is swept along towards the exit end of the nozzle it will be heated and mixed with the fluid constituting the jet produced by the nozzle and will add its volume to that of the jet forming gas. If desired, the quantity of cooling fluid may be regulated to control the temperature of the jet issuing from the nozzle to, if necessary, lower the temperature of the jet to a point at which it will not injure the blades of a turbine, or other structure, against which the jet impinges.

The nozzle shown in Figs. 3 and 4 is, in general, similar to that shown in Figs. 1 and 2 with the exception that the block 28 instead of being provided with small bores or apertures, as indicated at 26 in Figs. 1 and 2, is formed of a generally porous material through which the cooling fluid may flow from the space 22 to the nozzle bore 12. Such a block may conveniently be formed by including a pore forming material in the material from which the block is made before firing of the material to form the finished block or may be formed by sintering granulated heat resistant material in such a manner as to leave sufficient space between the granules so that the cooling fluid may pass therethrough, or by other convenient or desired means known to the art.

While a suitable mechanical embodiment in two slightly different forms has been shown in the accompanying drawing and hereinabove described for the purpose of disclosing the invention, it is to be understood that the invention is not limited to the particular embodiments so illustrated and described, but that such changes in the size, shape and arrangement of the various parts may be resorted to as come within the scope of the sub-joined claims.

Having now described the invention so that others skilled in the art may clearly understand the same, what it is desired to secure by Letters Patent is as follows:

1. A heat resistant expansion nozzle for producing a fluid jet from a source of hot gas under pressure comprising a block of refractory material having a smooth walled gas expanding bore therein, said bore having a convergent inlet portion and a restricted throat portion smoothly merging into each other to form a laminar flow gas expanding bore, and means for protecting the walls of said bore from the effects of heat and erosion by said hot gas including, a cooling chamber around said block, means for introducing a cooling fluid into said chamber under a pressure higher than the pressure of the hot gas passing through said converging inlet portion of said bore, and means for maintaining a cooling and insulating layer of cooling fluid between said hot gas and the walls of said bore comprising restricted passages extending generally radially from both the convergent and the throat portions of said bore to said chamber, said restricted passages being of greater length and consequently greater flow restriction at said throat portion than at said convergent portion.

2. A heat resistant expansion nozzle for producing a fluid jet from a source of hot gas under pressure comprising a block of refractory material having a smooth walled gas expanding bore therein, said bore having a convergent inlet portion, a restricted throat portion, and a diverging outlet portion smoothly merging into each other to form a laminar flow gas expanding bore, and means for protecting the walls of said bore from the effects of heat and erosion by said hot gas including, a cooling chamber around said block, means for introducing a cooling fluid into said chamber under a pressure higher than the pressure of the hot gas passing through said converging inlet portion of said bore, and means for maintaining a cooling and insulating layer of cooling fluid between said hot gas and the walls of said bore comprising axially spaced restricted passages extending generally radially from each said convergent, throat and divergent portions of said bore to said chamber, said restricted passages being of greater length and consequently greater flow restriction at said throat portion than at said convergent portion and being more widely spaced axially at said divergent portion than at said throat portion.

VICTOR J. SKOGLUND.